United States Patent
Uno et al.

[11] Patent Number: 5,310,212
[45] Date of Patent: May 10, 1994

[54] AXLE BEAM TYPE SUSPENSION ARRANGEMENT FOR VEHICLE

[75] Inventors: Takaaki Uno; Ken Sugino, both of Kanagawa, Japan

[73] Assignees: Nissan Motor Co., Ltd., Yokohama; Nissan Shatai Company, Limited, Hiratsuka, both of Japan

[21] Appl. No.: 858,714

[22] Filed: Mar. 27, 1992

[30] Foreign Application Priority Data

Mar. 29, 1991 [JP] Japan ................. 3-066189

[51] Int. Cl.⁵ ............................................. B60G 7/02
[52] U.S. Cl. ................................ 280/689; 280/688; 280/717; 280/724
[58] Field of Search ........... 280/688, 724, 723, 689, 280/726, 673, 717, 715

[56] References Cited

U.S. PATENT DOCUMENTS

| | | |
|---|---|---|
| 2,777,686 | 1/1957 | Giacosa et al. ............ 280/715 |
| 4,153,272 | 5/1979 | Fiedler et al. ............. 280/689 |
| 4,589,677 | 5/1986 | Matschinsky ............. 280/676 |
| 4,703,947 | 11/1987 | Tattermusch et al. ....... 280/689 |
| 4,765,650 | 8/1988 | Kameshima et al. ........ 280/688 |

FOREIGN PATENT DOCUMENTS

| | | |
|---|---|---|
| 220851 | 5/1987 | European Pat. Off. ............ 280/724 |
| 2316004 | 10/1974 | Fed. Rep. of Germany ...... 280/689 |
| 3136016 | 3/1983 | Fed. Rep. of Germany ...... 280/717 |
| 1479822 | 5/1967 | France ................. 280/688 |
| 58-139807 | 8/1983 | Japan ................. 280/688 |
| 77507 | 4/1986 | Japan ................. 280/688 |
| 28013 | 1/1989 | Japan ................. 280/688 |
| 28014 | 1/1989 | Japan ................. 280/688 |
| 197905 | 9/1923 | United Kingdom ............... 280/689 |

*Primary Examiner*—Karin L. Tyson
*Attorney, Agent, or Firm*—Foley & Lardner

[57] ABSTRACT

An axle beam suspension arrangement comprises a lateral link assembly which is mounted to a single support point on a vehicle body and two support points on an axle beam of the vehicle. The lateral link assembly consists of a lateral link member connected between a support point on the axle beam and the support point on the vehicle body, an assist link is provided which connects between the second support point on the axle beam and a point on the length of the lateral link, closer to the end at which the lateral link connects to the axle than the end connecting to the vehicle body. The lateral link is connected to the axle beam support point via a bush which is flexible in the axial direction of the lateral link. Thus scuff, or vertical disalignment of the vehicle wheels during bounding and rebounding is prevented while occurrence of rolling may be detected while jack-up forces applied to vehicle wheels are absorbed. The arrangement is further applicable to watt link type suspension arrangements incorporating to lateral links and an intermediate link. According to this arrangement, road unevenness input to the lateral links is absorbed by rotation of the intermediate link.

8 Claims, 5 Drawing Sheets

AXLE BEAM TYPE SUSPENSION ARRANGEMENT FOR VEHICLE

BACKGROUND OF THE INVENTION

1. Field of The Invention

The present invention relates generally to an axle beam type suspension arrangement for automotive vehicles. Particularly, the present invention relates to a three link suspension which eliminates lateral forces between road wheel and a road surface and which can minimize jack-up forces applied to vehicle wheels.

2. Description of The Prior Art

Suspension systems are commonly known which utilize a trailing arm portion to absorb vehicle motion forces in the forward direction of the vehicle, coil springs in combination with shock absorbers to absorb vertical forces and a lateral link (or panel load) to absorb lateral forces applied to the vehicle.

However, in such prior art suspension systems, since the lateral link is a single member connected laterally between a portion of the vehicle body and the axle beam, during bounding and rebounding of the vehicle wheels, a certain amount of displacement, called scuff variation, or tread variation, occurs between the vehicle body and the vehicle axle due to pulling resulting from the arc like travel of the lateral link.

To eliminate occurrence of scuff variation between the suspension and the vehicle body, Japanese Patent Application First Publication (unexamined) 2-254006 discloses a suspension system including an assist link associated with the lateral link for absorbing a lateral displacement variation amount $\epsilon$. Further, Japanese Utility Model Application First Publication 53-30618 discloses a watt link type lateral link assembly for compensating for scuff between the suspension and the vehicle body.

In the above cited prior art systems, a three point support arrangement is utilized. That is the lateral link assembly is connected to a single point on the axle beam and to two points on the vehicle body. According to the above arrangement scuff variation between the vehicle body and the suspension are suitably compensated. However, during occurrence of vehicle rolling, such as during turning, with occurrence of wheel bounding and rebounding, the above arrangements, although eliminating scuff between the vehicle body and suspension, permit scuff to occur between the road wheels and the road surface causing jack-up force to be applied to the suspension. This undermines overall vehicle stability, particularly during cornering.

SUMMARY OF THE INVENTION

It is therefore a principal object of the present invention to provide an axle beam suspension for a vehicle. Particularly, to provide an axle beam suspension which can eliminate occurrence of scuff between road wheels and a road surface and absorb jack-up forces during occurrence of rolling during straight travel or turning especially on uneven road surfaces.

It is a further object of the present invention to provide and axle beam type suspension which is compact, simple in design and which may be manufactured at reduced cost.

In order to accomplish the aforementioned and other objects, an axle beam type suspension according to the present invention comprises: an axle beam supportable of vehicle road wheels on left an right sides thereof respectively and supportable of a vehicle body thereon; a lateral link assembly for compensating lateral forces applied to vehicle wheels during vehicle running, the lateral link assembly comprising a lateral link pivotally connected to the vehicle axle beam at one end thereof and pivotally connected to a point on the vehicle body at another end thereof, an assist link pivotally connected at one end thereof to the vehicle axle beam and at another end thereof pivotally connected to the lateral link; a bush mounting the end of the lateral link to the axle beam, the bush being flexible in the axial direction of the lateral link to a predetermined degree sufficient for compensating lateral forces applied to the wheels during vehicle running.

According to another aspect of the present invention, an axle beam type suspension arrangement comprises: an axle beam supporting vehicle road wheels at left and right sides thereof respectively; a lateral link assembly for compensating lateral forces applied to vehicle wheels during vehicle running, the lateral link assembly comprising a lateral link pivotally connected to the vehicle body at one end thereof and pivotally connected to an end of a first assist link at another end thereof, another end of the first assist link being pivotally connected to the axle beam, a second assist link is provided which is pivotally connected at one end thereof to the vehicle axle beam and at another end thereof pivotally connected to the lateral link.

According to a still further aspect of the present invention, an watt link type axle beam suspension for an automotive vehicle comprises: an axle beam supporting vehicle road wheels at left and right sides thereof respectively; a first lateral link pivotally connected at one end thereof to the axle beam; a second lateral link pivotally connected to the axle beam at a side opposite to the first lateral link; an intermediate link pivotally connected to a vehicle body at a substantially center portion of the intermediate link and having two oppositely extending end portions, another end of the first lateral link being pivotally connected to one of the end portions and another end of the second lateral link being connected to the other of the end portions.

DESCRIPTION OF THE PREFERRED EMBODIMENT

Figure 1:
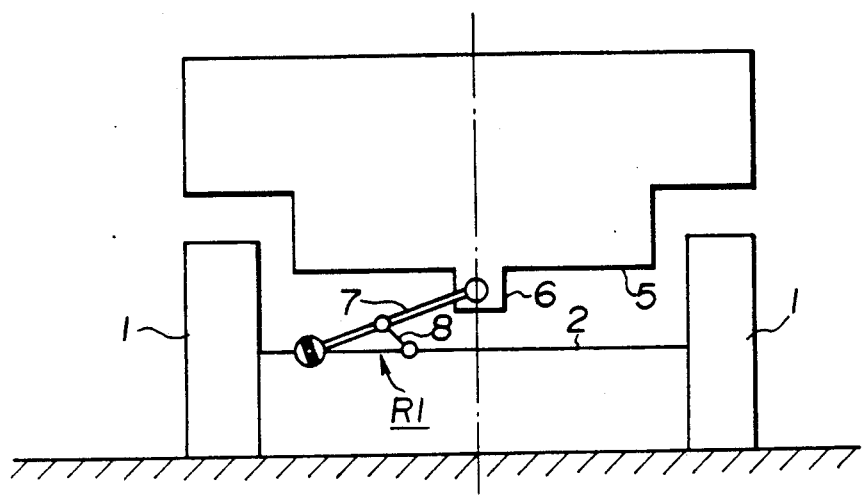
FIG. 1 is a schematic front view of an axle beam suspension arrangement according to a first embodiment of the invention.
Figure 2:
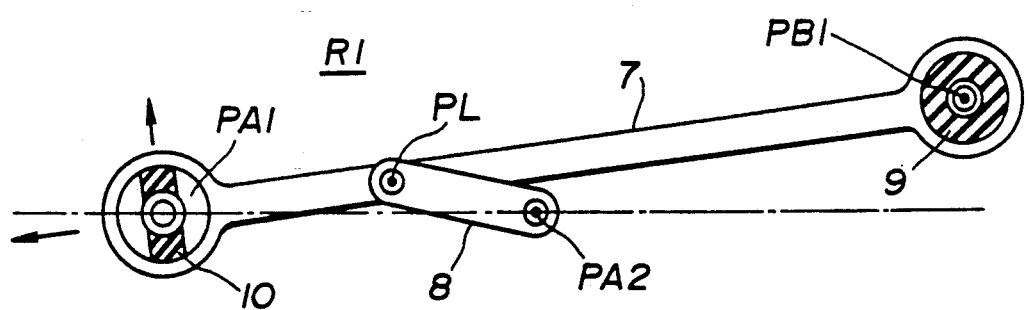
FIG. 2 shows a frontal view of a lateral link assembly in an initial position according to the first embodiment.

Referring now to the drawings, particularly to FIGS. 1-2, an axle beam suspension arrangement according to the first embodiment of the invention is applicable to a three link type rear suspension for front wheel drive vehicles. FIG. 2 shows a close up view of a lateral link 7 and an assist link 8 of the suspension.

A three link suspension includes, left and right wheels 1 rotatably attached to an axle beam 2. From the wheels 1, trailing arms (not shown) are extended in a directing corresponding to the direction of vehicle travel, a strut (not shown) is extended from each of the left and right wheels in the vertical direction and, a lateral link assembly R1 is provided in the horizontal direction.

According to the above arrangement, the lateral link assembly R1 is attached at one end thereof to the axle beam 2 which is supported on each end by the wheels 1 and attached at another portion thereof to a cross member 5, which is part of, or fixed to, the vehicle body at a position corresponding to a vertical center line thereof, via a center bracket 6. The lateral link assembly is comprised of a lateral link 7 connected to the axle beam 2 and an assist link 8 joined to the lateral link along the length thereof, another portion of the assist link being connected to the axle beam. The combination of the lateral link 7 and the assist link 8 forming a Y shaped arrangement.

As seen in FIG. 2, a rubber bush 9 is provided where the end of the lateral link 7 joins the center bracket 6. Further, the other end of the lateral link 7 and one end of the assist link 8 are attached to the axle beam, a rubber bush 10 is provided at the end of the lateral link where the lateral link is attached to the axle beam. However, the bush 10 is designed to allow a certain degree of movement in the axial direction of the lateral link 7 and to be relatively rigid in the perpendicular direction.

The assist link 8 is interposed between the axle beam 2 and the lateral link 7, being mounted on pins or the like.

Referring to FIG. 2, an axis PB1 is located at the end of the lateral link 7 where it connects to the vehicle body, at the end of the lateral link 7 which connects to the axle, an axis PA1 is provided. One end of the assist link is connected to the axle via an axis PA2, and the other end is attached to the shaft of the lateral link 7 by an axis PL. The axis PL is provided along a line between axis PA1 and PB1 at a position closer to the axis PA1.

Hereinbelow, an operation of the suspension of the first embodiment will be described with reference to FIGS. 4-7.

Figure 3:
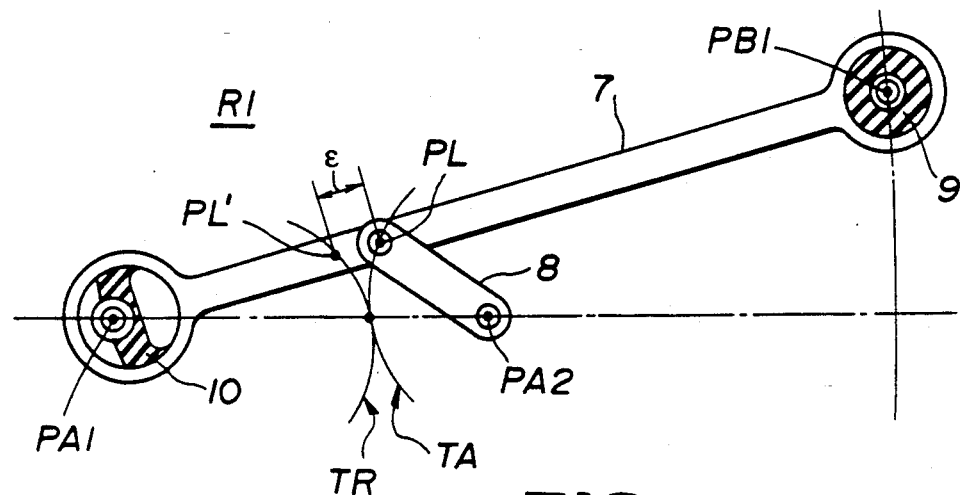
FIG. 3 shows the lateral link assembly of FIG. 3 in a distended position of the link assembly such as during wheel bounding or rebounding.

As seen in FIG. 3, if the vehicle is running on an uneven surface, during bounding and rebounding of the vehicle wheels 1, the axis PL of the assist link pivots on the axis PA2 along a locus TA. On the other hand, the axis PA1 moves according to bounding and rebounding of the vehicle. However, if the distance between the axis PA1 and axis PL of the assist link were to remain constant, the axis PL would pivot according to the rotation of the axis PA1 thus describing a hypothetical locus TR.

Thus, between the locus of the axis PL and the axis PA2 and the imaginary locus of the axis PL' and the axis PA1 a positional variation distance of $\epsilon$ is permissible.

Figure 4:
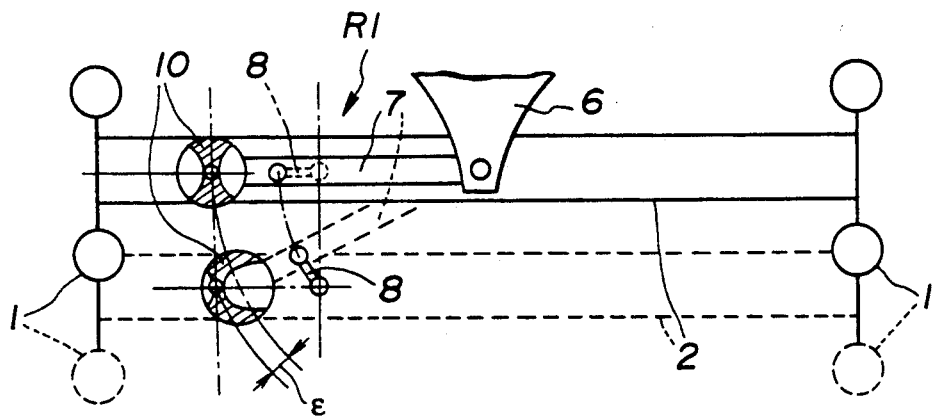
FIG. 4 is a frontal view showing how a positional variation $\epsilon$ is absorbed by the link assembly to prevent pulling or scuff of the road wheels.

Thus, since the position the axis PA1 is variable of position in the longitudinal direction of the lateral link 7 within the tolerance of the bush 10, pulling of the lateral link on the axle beam, which may cause vertical disalignment (scuff) of the axle beam during bounding or rebounding of the wheels 1 is substantially compensated, allowing the wheels 1 to maintain vertical alignment during bounding and rebounding on uneven road surfaces as seen in FIG. 4.

Thus, according to the above-described embodiment, wherein a lateral link assembly R1 comprises one support point connected to a vehicle body and two support points connected to a vehicle axle, the vehicle body posture is not affected by scuff applied to the wheels 1.

Figure 5:
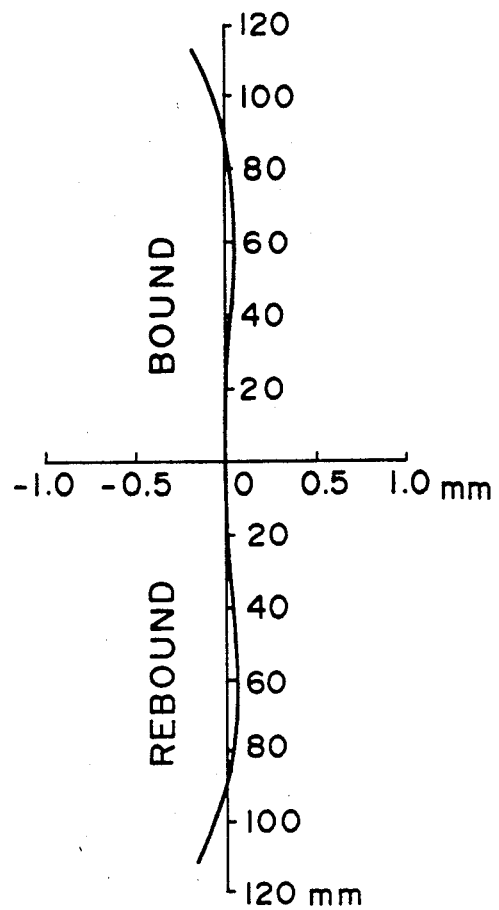
FIG. 5 is a graph indicating a degree of scuff applied to vehicle wheels during bounding and rebounding when utilizing the lateral link construction of the invention.
Figure 6:
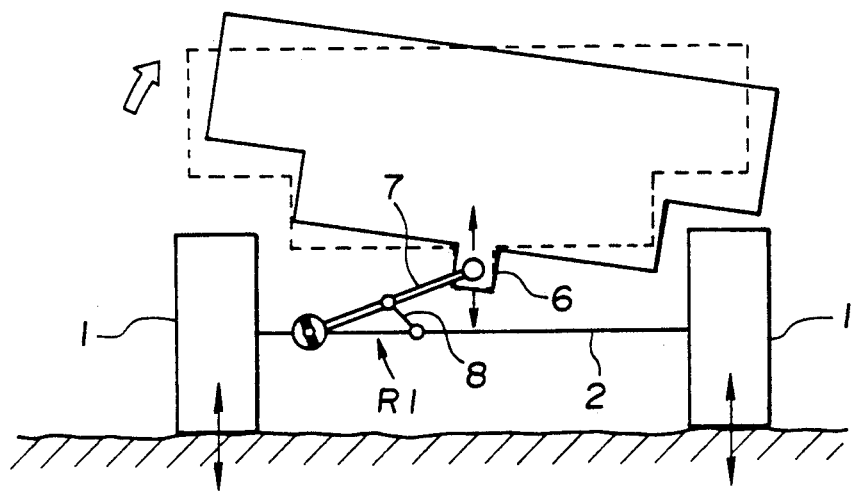
FIG. 6 is a schematic view of the suspension arrangement of the invention during occurrence of vehicular rolling.

Referring to FIG. 5 it can be seen that in both bounding and rebounding directions that a degree of scuff is effectively minimized. Further, FIG. 6 demonstrates how, during vehicle rolling, body bounding and rebounding is maintained substantially vertical thus applying substantially vertical forces to the wheels with minimal occurrence of scuff.

Thus according to the present invention the following advantages may be obtained:

1) rolling of the vehicle body may be detected irregardless of the minimizing of scuff, and lateral forces such as jack-up force affecting the vehicle body may be substantially absorbed, accordingly, whether the vehicle is running straight or during turning, vehicle handling variations are minimized and stable and secure vehicle handling may be realized;

2) provision of the bush 10 which is flexible in the axial direction of the lateral link 7 allows effective operation of the transmission with only two links connected thereto, thus the mechanism is simplified for easy manufacture and costs are reduced;

3) due to the provision of the pivotal axis PB1 on the vehicle body, vehicle roll characteristics as well as lateral movement characteristics of the vehicle are identical at both left and right sides providing consistent vehicle handling;

4) since the lateral link assembly is provided on only one side of the pivotal axis PB1 on the vehicle body space required for installation is substantially small and a degree freedom for design and layout of the suspension is increased.

Figure 7:
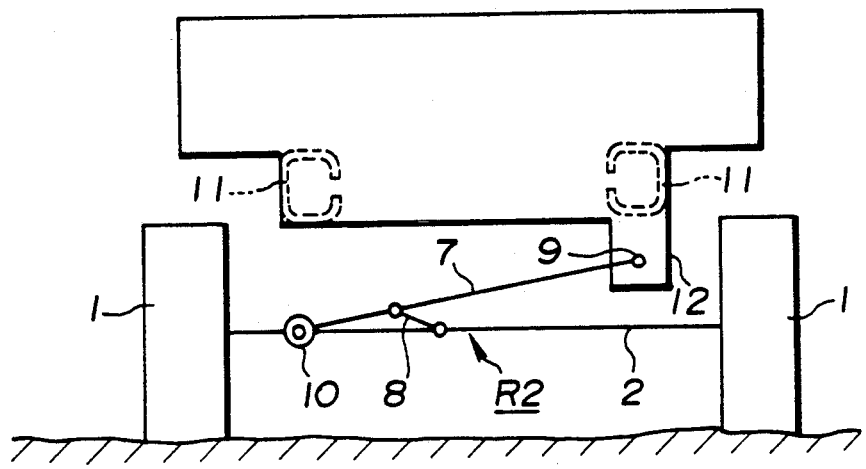
FIG. 7 shows a schematic view of a second embodiment of an axle beam type suspension according to the invention.

FIG. 7 shows a second embodiment of an axle beam type suspension according to the present invention.

As seen in FIG. 7, in the present embodiment, the bush associated with the vehicle body is positioned asymmetrically to one side of a vertical center line of the vehicle body. As in the previous embodiment, a lateral link assembly R2 connects to the vehicle body at a single support point, while connecting to the axle beam of the vehicle at two support points. The main point of difference from the arrangement of the first embodiment is that a bracket 12, depended from a one of two side members 11 provided at each side of the vehicle body anchors the bush 9. Functionally, the second embodiment operates identically to the first embodiment.

According to the construction of the second embodiment, the above mentioned advantages 3) and 4) are not obtained. However, the above mentioned advantages 1) and 2) are provided and, in addition, the following advantage is further available;

5) since the vehicle body support point is provided at the bracket 12 depending from the side members 11 of the vehicle body, a necessary strength for support of the lateral link assembly R2 is easily obtainable without need of additional structural reinforcement.

Hereinbelow, a third embodiment of an axle beam type suspension according to the present invention will be described in detail.

Figure 8:
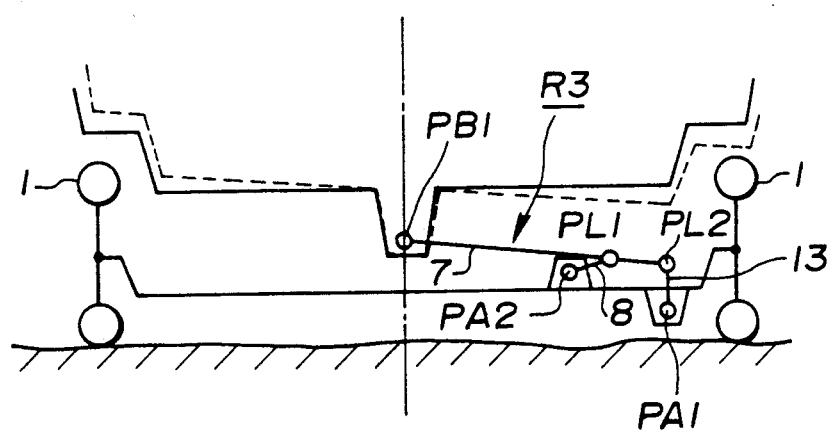
FIG. 8 shows a schematic view of a third embodiment of an axle beam type suspension according to the invention.

As seen in FIG. 8, according to the third embodiment, the principal difference between the first embodiment is in the construction of the lateral link assembly R3. In the present embodiment, instead of the flexible bush 10 of the first embodiment, the lateral link assembly R3 includes a second assist link 13 which connects the axle side end portion of the lateral link 7 with the axle beam 2. In operation the second assist link 13 is effective for compensating the positional variation distance ∈ during bounding and rebounding of the wheels. Both assist links 8 and 13 are connected via axes PL1 and PL2 to the lateral link 7. In other respects the construction and functioning of the third embodiment is substantially the same as that of the first embodiment and enjoys the advantages 1), 3), and 4) quoted hereinabove.

Figure 9:
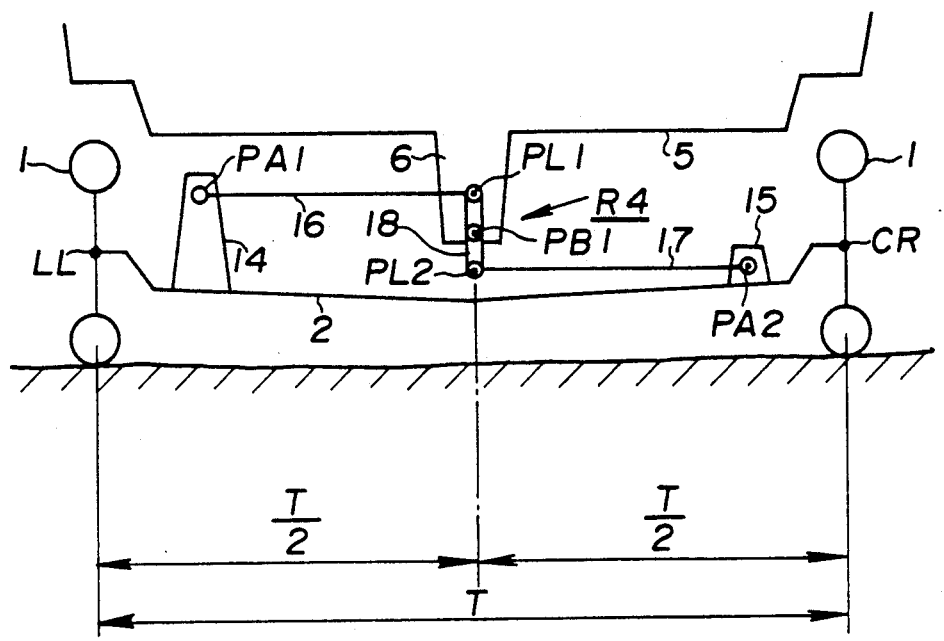
FIG. 9 shows a schematic view of a fourth embodiment of a watt link type axle beam suspension according to the invention.

Referring to FIG. 9, a fifth embodiment of an axle beam type suspension according to the present invention will be described in detail.

The present embodiment applies to a watt link type axle beam suspension utilizing a lateral link assembly R4 comprising first and second lateral links 16 and 17 associated via an intermediate link 18. Road wheels 1 are fixed to both ends of an axle beam 2 and beam brackets 14 and 15 are also provided on the axle beam 2. A cross member 5 (associated with the vehicle body) is provided with a center bracket 6 which fixes the pivotal position of the vehicle body. First and second lateral links 16 and 17 are provided for receiving lateral force from the wheels 1. The first and second lateral links are connected to the intermediate link 18 which is pivotally mounted on the center bracket 6 of the vehicle body.

The connection of the intermediate link 18 and the center bracket 6 forms the one vehicle body support point of the three link suspension. The first and second lateral links 16 and 17 are respectively connected to the axle beam to complete the three link support structure.

The above described arrangement is enabled by the axis PB1 of the intermediate link 18 and axes PA1 and PA2 of the lateral links 16 and 17 respectively. Further, the first lateral link 16 is connected to the intermediate link 18 at an axis PL1 by a bush (not shown in the drawing) and the second lateral link 17 is connected to another portion of the intermediate link by at an axis PL2 by a second bush (not shown). The pivotal axis PB1 joining the intermediate link 18 to the center bracket 6 is mounted by a bush (not shown) positioned substantially in the center of a space T which represents the overall wheelspan, or tread of the wheels 1. The first and second lateral links are therefore of substantially the same length.

Further, a distance from the axis PB1 to PL1 is the same as a distance from the axis PB1 to PL2 with the axis PB1 being substantially in the center of the intermediate link 18. Generally, according to the watt link technique, when the intermediate link 18 is positioned vertically, the first and second lateral links 16 and 17 are parallel to a an imaginary line between a left wheel center CL and a right wheel center CR.

In operation, when the vehicle runs on an uneven surface or the like, during bounding and rebounding of the vehicle wheels, road shock applied to the first and/or second lateral links 16, 17 is absorbed by rotation of the intermediate link 18. In the present embodiment, the positioning of the one vehicle body support point and the two axle beam support points is fixedly maintained and vehicle body posture relative to the road surface is maintained as scuff occurring between the road wheels 1 and the road surface is substantially eliminated.

Figure 10:
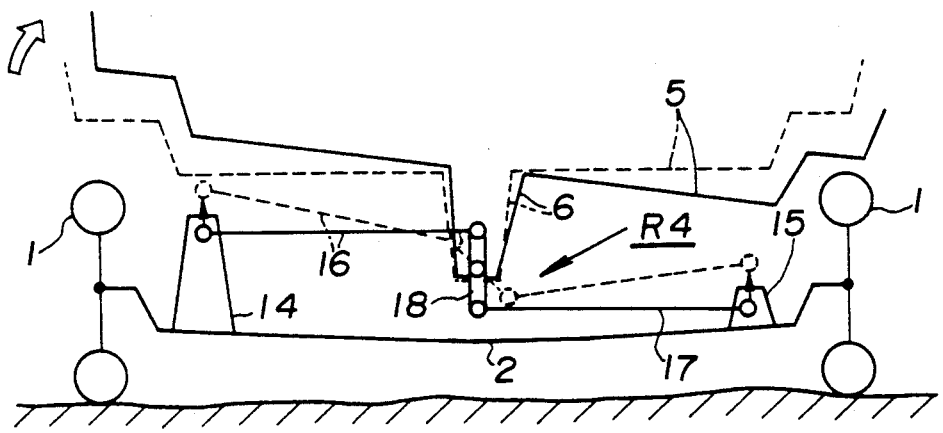
FIG. 10 shows the suspension of the fourth embodiment during occurrence of vehicular rolling.

According to the above construction, an as shown in FIG. 10, during occurrence of vehicle rolling, even during wheel bounding and rebounding, jack-up force in not applied to the wheels as the orientation of the first and second lateral links and the intermediate link 18 is changed to allow for rolling of the vehicle body without transferring jack-up forces to the axle.

Thus, according to the above-described watt link type axle beam suspension the following advantages may be realized;

1) rolling of the vehicle body may be detected irregardless of the minimizing of scuff, and lateral forces such as jack-up force affecting the vehicle body may be substantially absorbed, accordingly, whether the vehicle is running straight or during turning, vehicle handling variations are minimized and stable and secure vehicle handling may be realized;

2) due to the provision of the intermediate link incorporating pivotal axis PB1 on the vehicle body, vehicle roll characteristics as well as lateral movement characteristics of the vehicle are identical at both left and right sides providing consistent vehicle handling;

Further, it will be noted that the advantages of the arrangement of the present invention are not limited to the arrangement shown in the drawings, for example, though the embodiments are drawn to a three link suspension, the benefits of the present invention may also be applied to a five link suspension, also, though the embodiments are drawn to a rear suspension the disclosed structure may also be advantageously applied to a front suspension.

What is claimed is:

1. A three point type axle beam suspension arrangement for an automotive vehicle comprising:
    an axle beam supportable of vehicle road wheels on left and right sides thereof respectively and supportable of a vehicle body thereon; and
    a lateral link assembly, said lateral link assembly comprising
        a lateral link having a first end portion having a first axis attached to said axle beam, said first axis resiliently mounted at said first end by a bushing, a resiliency of said bushing in an axial direction of said lateral link being greater than a resiliency of said bushing in a direction perpendicular to said axial direction of said lateral link, said lateral link further having a second end having a second axis attached to said vehicle body, said second axis being resiliently mounted in a second bushing having equal resiliency in all directions, and
        an assist link pivotally connected at a third axis located at one end thereof to said axle beam and at a fourth axis located at another end thereof pivotally connected to said lateral link;
        said resiliency in said axial direction being established to a predetermined degree establishing displacement between said first axis and said third axis according to pivotal movement of said lateral link at said first axis such that a vertical plane of movement of said first axis is constant during bounding and rebounding movement of vehicle wheels mounted on said axle beam.

2. A suspension arrangement as set forth in claim 1, wherein said another end of said assist link is pivotally connected to said lateral link at a position closer to where said lateral link connects to said axle beam than where said lateral link connects to said vehicle body.

3. A suspension arrangement as set forth in claim 1, wherein said lateral link is pivotally connected to said vehicle body at a substantially center portion of a width of said vehicle body.

4. A suspension arrangement as set forth in claim 1, wherein said lateral link is pivotally connected to said axle beam at a side thereof substantially opposite a side of said vehicle body to which said second end of said lateral link is connected.

5. A suspension arrangement as set forth in claim 1, wherein said second axis located at said second end of said lateral link is pivotally connected to a bracket depending from a longitudinal side member of said vehicle body at a side of said vehicle substantially opposite the side of said axle beam to which said first axis of said lateral link is connected.

6. A suspension arrangement as set forth in claim 1, wherein said first and second axes of said lateral link are resiliently mounted in annular end portions of said lateral link.

7. An axle beam type suspension arrangement for an automotive vehicle comprising:
an axle beam supporting vehicle road wheels at left and right sides thereof respectively;
a lateral link assembly for compensating lateral forces applied to vehicle wheels during vehicle running, said lateral link assembly comprising a lateral link pivotally connected to said vehicle body at one end thereof and pivotally connected to an end of a first assist link at another end thereof, another end of said first assist link being pivotally connected to said axle beam, a second assist link is provided which is pivotally connected at one end thereof to said vehicle axle beam and at another end thereof pivotally connected to said lateral link such that said pivotal connection of said first assist link to said axle beam is made at an elevation lower than said pivotal connection of said second assist link to said axle beam.

8. A suspension arrangement as set forth in claim 7, wherein said lateral link is pivotally connected to said vehicle body at a substantially center portion of a width of said vehicle body.

* * * * *